United States Patent
Forsythe

(10) Patent No.: US 9,130,376 B2
(45) Date of Patent: *Sep. 8, 2015

(54) SYSTEM AND METHOD FOR EXTERNALLY CONTROLLING THE CHARGING OF A BATTERY POWERED DEVICE

(75) Inventor: Lawrence David Forsythe, Mississauga (CA)

(73) Assignee: PSION INC., Mississauga, Ontario (CA)

( * ) Notice: Subject to any disclaimer, the term of this patent is extended or adjusted under 35 U.S.C. 154(b) by 399 days.

This patent is subject to a terminal disclaimer.

(21) Appl. No.: 13/642,889

(22) PCT Filed: Apr. 14, 2011

(86) PCT No.: PCT/CA2011/000415
§ 371 (c)(1),
(2), (4) Date: Oct. 23, 2012

(87) PCT Pub. No.: WO2011/130826
PCT Pub. Date: Oct. 27, 2011

(65) Prior Publication Data
US 2013/0038274 A1   Feb. 14, 2013

Related U.S. Application Data

(63) Continuation-in-part of application No. 12/766,251, filed on Apr. 23, 2010, now Pat. No. 8,508,183, which is a continuation-in-part of application No. 12/766,257, filed on Apr. 23, 2010, now Pat. No. 8,415,923.

(51) Int. Cl.
*H02J 7/00* (2006.01)

(52) U.S. Cl.
CPC ............. *H02J 7/0004* (2013.01); *H02J 7/0008* (2013.01); *H02J 7/0073* (2013.01)

(58) Field of Classification Search
CPC ...... H02J 7/0004; H02J 7/0073; H02J 7/0008
USPC .................................. 320/107, 113–115, 137
See application file for complete search history.

(56) References Cited

U.S. PATENT DOCUMENTS

| 4,876,513 | A | 10/1989 | Brilmyer et al. |
| 5,349,282 | A * | 9/1994 | McClure ........................ 320/136 |

(Continued)

OTHER PUBLICATIONS

PCT International Application No. PCT/CA2011/000415 Search Report mailing date Aug. 17, 2011.

(Continued)

*Primary Examiner* — M'Baye Diao

(57) ABSTRACT

A system and method for externally controlling the charging of a battery powered mobile computing device includes a charging unit configured to be electrically coupled to the mobile computing device to charge a battery therein. The charging unit comprises a charger configured to operate in a first mode to provide a constant charge current to the battery to be charged and to operate in a second mode to provide a constant charge voltage to the battery to be charged and where the switch from the first mode to the second mode occurs when the voltage at the battery a predefined threshold voltage. The charger including an offset compensator configured for applying an offset voltage to the measured output of the charger to maintain the charger in the first mode to compensate for voltage drops between the charger and the battery thereby allowing the battery voltage to reach the threshold voltage.

9 Claims, 4 Drawing Sheets

(56) References Cited

U.S. PATENT DOCUMENTS

| | | | |
|---|---|---|---|
| 5,596,259 | A | 1/1997 | Mino et al. |
| 5,646,501 | A | 7/1997 | Fishman et al. |
| 5,744,936 | A * | 4/1998 | Kawakami .................... 320/120 |
| 5,818,199 | A * | 10/1998 | Beard ........................... 320/116 |
| 5,963,012 | A | 10/1999 | Garcia et al. |
| 6,002,237 | A * | 12/1999 | Gaza ............................ 320/116 |
| 6,078,871 | A * | 6/2000 | Anderson ....................... 702/63 |
| 6,172,481 | B1 | 1/2001 | Curtiss |
| 6,553,263 | B1 | 4/2003 | Meadows et al. |
| 7,071,655 | B2 | 7/2006 | Murakami et al. |
| 7,271,568 | B2 | 9/2007 | Purdy et al. |
| 7,435,508 | B2 | 10/2008 | Lee et al. |
| 8,035,347 | B2 | 10/2011 | Umetsu et al. |
| 8,138,723 | B2 | 3/2012 | Carkner |
| 2002/0000788 | A1 | 1/2002 | Ostergaard et al. |
| 2003/0094924 | A1 * | 5/2003 | Oh ................................ 320/128 |
| 2003/0117112 | A1 * | 6/2003 | Chen et al. .................... 320/137 |
| 2003/0155892 | A1 * | 8/2003 | Poletti ........................... 320/137 |
| 2005/0253554 | A1 * | 11/2005 | DiFazio et al. ................ 320/114 |
| 2009/0051320 | A1 | 2/2009 | Muntermann |
| 2009/0167312 | A1 | 7/2009 | Keates et al. |
| 2009/0289604 | A1 | 11/2009 | Carkner |
| 2011/0221604 | A1 * | 9/2011 | Johnson ......................... 340/664 |

OTHER PUBLICATIONS

Non-Final Office Action, mailing date Mar. 13, 2012 issued in U.S. Appl. No. 12/766,257, filed Apr. 23, 2010.

Final Office Action, mailing date Oct. 12, 2012 issued in U.S. Appl. No. 12/766,257, filed Apr. 23, 2010.

Non Final Office Action mailed Nov. 8, 2012 in U.S. Appl. No. 12/766,251, Lawrence Forsythe, filed Apr. 23, 2010.

Corresponding PCT/CA/2011/000415 International Preliminary Report on Patentability; Issued Oct. 23, 2012.

* cited by examiner

SYSTEM AND METHOD FOR EXTERNALLY CONTROLLING THE CHARGING OF A BATTERY POWERED DEVICE

RELATED APPLICATIONS

This application is the national stage of international application no. PCT/CA2011/000415, which claims the benefit of priority from U.S. patent application Ser. No. 12/766,257, filed Apr. 23, 2010 and entitled "EXTERNAL BATTERY CHARGING UNIT" and from U.S. patent application Ser. No. 12/766,251 filed Apr. 23, 2010 and entitled, "A SYSTEM AND METHOD FOR COMPENSATING FOR IMPEDANCE LOSS ASSOCIATED WITH AN EXTERNAL CHARGING UNIT". The contents of each of these aforementioned applications are incorporated herein, in their entireties, by reference.

TECHNICAL FIELD

The present invention relates generally to systems and methods for charging batteries. More specifically, the present invention relates to a system and method for charging a battery, or batteries, in a device using an external charging unit.

BACKGROUND ART

The availability and widespread adoption of mobile computing devices, such as smartphones, tablet computers, mobile data entry terminals etc. has increased significantly recently and this trend appears poised to continue for many more years. Given the proliferation of mobile computing devices, the size and weight of the mobile computing device has become an important factor in enhancing their adoption, usefulness and attractiveness for users. It is generally very desirable to be able to reduce the size and weight of mobile computing devices to increase their appeal to users. In addition to the expected issues of miniaturization, packaging and design necessary to reduce the size and weight of mobile computing devices, a related issue arises in that heat generated within the mobile computing device becomes a serious design issue due to the density of the components within the smaller enclosures for the computing devices and the higher operating speeds of processors within the computing devices, which results in additional heat generation, and the proliferation of radios (WiFi, Bluetooth, WAN, GPS, etc.) and other heat generating components with mobile computing devices.

An additional issue facing the manufacturers of mobile computing devices is the design and provisioning of the rechargeable batteries used by such devices. Again, as size and weight are important design considerations, the selection and design of batteries for mobile computing devices typically focuses on the energy storage density of the battery, with higher densities desired to enable longer operating times for the devices. Presently, the majority of mobile computing devices employ batteries with a lithium ion (Li-ion) battery chemistry as these batteries provide a good energy storage density.

However Li-ion and most, if not all, other battery chemistries suitable for use in mobile computing devices require carefully managed charging regimes to be employed to maximize the battery's energy storage and the potential operating lifetime (number of possible charge cycles, etc) of the battery and to reduce the possibility of dangerous conditions occurring during charging of the battery which could otherwise put the computing device and/or user at risk of harm.

Accordingly, mobile computing devices typically include charging control circuitry and/or mechanisms which operate to control the charging of their batteries and to prevent unsafe charging. While necessary for safe and appropriate operation of the charging functions of mobile computing devices, these control mechanisms add to the weight of the mobile computing device and also generate waste heat within the mobile computing device.

DISCLOSURE OF THE INVENTION

It is an object of the present invention to provide a system and method for charging at least one battery in a mobile computing device which obviates or mitigates at least one disadvantage of the prior art.

In accordance with an aspect of the present invention, there is provided an external charging unit for charging at least one re chargeable battery in a mobile computing device, the charging unit configured to be electrically coupled to the mobile computer device and being operable to provide a charge to the at least one rechargeable battery in accordance with a predefined charging profile; and the charging unit further comprising an offset compensator to apply an offset voltage to the charger to compensate for impedance loss between the charger and the at least one battery thereby such that the charging proceeds in accordance with the predefined charging profile.

Preferably, the predefined charging profile comprises operating the charger in a first mode to provide a constant predefined charge current to the at least one battery to be charged based on an output voltage of the charger and a in a second mode to provide a constant pre-defined charge voltage to the at least one battery to be charged and the charger switches from the first mode to the second mode when the output voltage of the charger reaches a threshold voltage predefined in the charging profile. Also preferably, the charger further comprises a charging processor responsive to the predefined charging profile which is received as parameters associated with the at least one battery to be recharged, the charging processor determining an occurrence of a current decrease for the at least one battery to be charged prior to a measured battery voltage of the at least one battery to be charged being at the threshold voltage and providing a trigger to the offset compensator in response to the occurrence; wherein the offset compensator is configured for applying the offset voltage in response to the trigger to adjust the output voltage of the charger such as to maintain the charger in the first mode.

In accordance with another aspect of the present invention, there is provided a charging unit for charging a rechargeable battery on a mobile computing device, the charging unit to be electrically coupled to the mobile computing device, the charging unit comprising: a charging circuit comprising a charger outputting a voltage and electrical current to the rechargeable battery, the charger operable to charge the battery in a first mode wherein a constant charge current is applied to the battery unit a predefined threshold voltage is obtained at the battery and to them operate in a second mode wherein a constant charge voltage is applied to the battery until the battery is charged; and an offset compensator configured for applying an offset voltage to a measurement of the output voltage of the charger to compensate for voltage drops in the charge path between the charger and the rechargeable battery thereby allowing the voltage of the rechargeable battery voltage to reach the threshold voltage before entering the second mode.

In accordance with yet another aspect of the present invention, the offset compensator is configured to apply the offset voltage to the output of the charger to increase the pre-defined threshold voltage to compensate for the impedance loss between the charger and the battery. In accordance with yet another aspect of the present invention, the offset voltage is related to a difference between the measured battery voltage and the pre-defined threshold voltage.

In accordance with yet another aspect of the present invention, the offset compensator is configured to continually apply the offset voltage to maintain the charger in the first mode until the measured battery voltage is at least at the pre-defined threshold voltage.

In accordance with yet another aspect of the present invention, there is provided a method for charging an external battery on a mobile device by a charging unit, the charging unit configured to be electrically coupled to the mobile device for electrical communication thereof, the method comprising: operating in a first mode to provide a constant pre-defined charge current to the external battery based on an output voltage of the charger; operating in a second mode to provide a constant pre-defined charge voltage to the external battery; switching from the first mode to the second mode when the output voltage of the charger reaches a predefined threshold voltage; and applying an offset voltage to the charger to maintain the charger in the first mode to compensate for impedance loss between the charger and the external battery thereby allowing the external battery voltage to reach the threshold voltage.

In accordance with yet another aspect of the present invention, there is provided a charging unit for communicating with a rechargeable battery located in a mobile computing device, the charging unit comprising: a connector port configured to couple the charging unit to the rechargeable battery in the mobile computing device; a charging circuit for monitoring a voltage reading of the rechargeable battery through the connector port, the charging unit configured to be coupled to an electrical power source for providing an electrical charge for charging the rechargeable battery in dependence upon the monitored voltage reading.

According to yet another aspect of the present invention, there is provided a method for charging a rechargeable battery in a mobile computing device from an external charging unit, the charging unit configured to be electrically coupled to the mobile computing device, the method comprising: operating in a first mode wherein a constant predefined charge current is supplied to the rechargeable battery until the battery voltage is at least equal to a predefined threshold voltage for the battery; during operation in the first mode, measuring the output voltage of the charging unit to determine if the output voltage of the charger is at least equal to the predefined threshold voltage for the battery and, if, the output voltage is at least equal to a predefined threshold voltage for the battery, determining if the charge current has decreased; if the charge current has decreased, obtaining from a power processor associated with the battery an indication of the battery voltage and, if the battery voltage is less than the predefined threshold voltage, then applying an offset voltage to the measurement of the charger output voltage to compensate for voltage drops between the output of the charger and the rechargeable battery; if the charge current has decreased and the battery voltage is at least equal to the predefined threshold voltage, operating the charger in a second mode wherein a constant charge voltage is applied to the battery; and when in the second mode the charge current falls below a predefined minimum, deciding the battery is charged.

According to yet another aspect of the present invention, there is provided mobile computing device comprising: a battery module configured to receive at least two different rechargeable batteries; a device circuitry module configured to communicate between the battery module and a charging circuit located on an external charging unit; and a connector port configured to couple the external charging unit to the battery module for providing an electrical charge to said at least one rechargeable battery, wherein each of said at least two different rechargeable batteries are compatible for being charged by a corresponding charging circuitry.

BRIEF DESCRIPTION OF THE DRAWINGS

Embodiments of the invention will now be described by way of example only with reference to the following drawings in which.

DETAILED DESCRIPTION OF INVENTION

Figure 1:
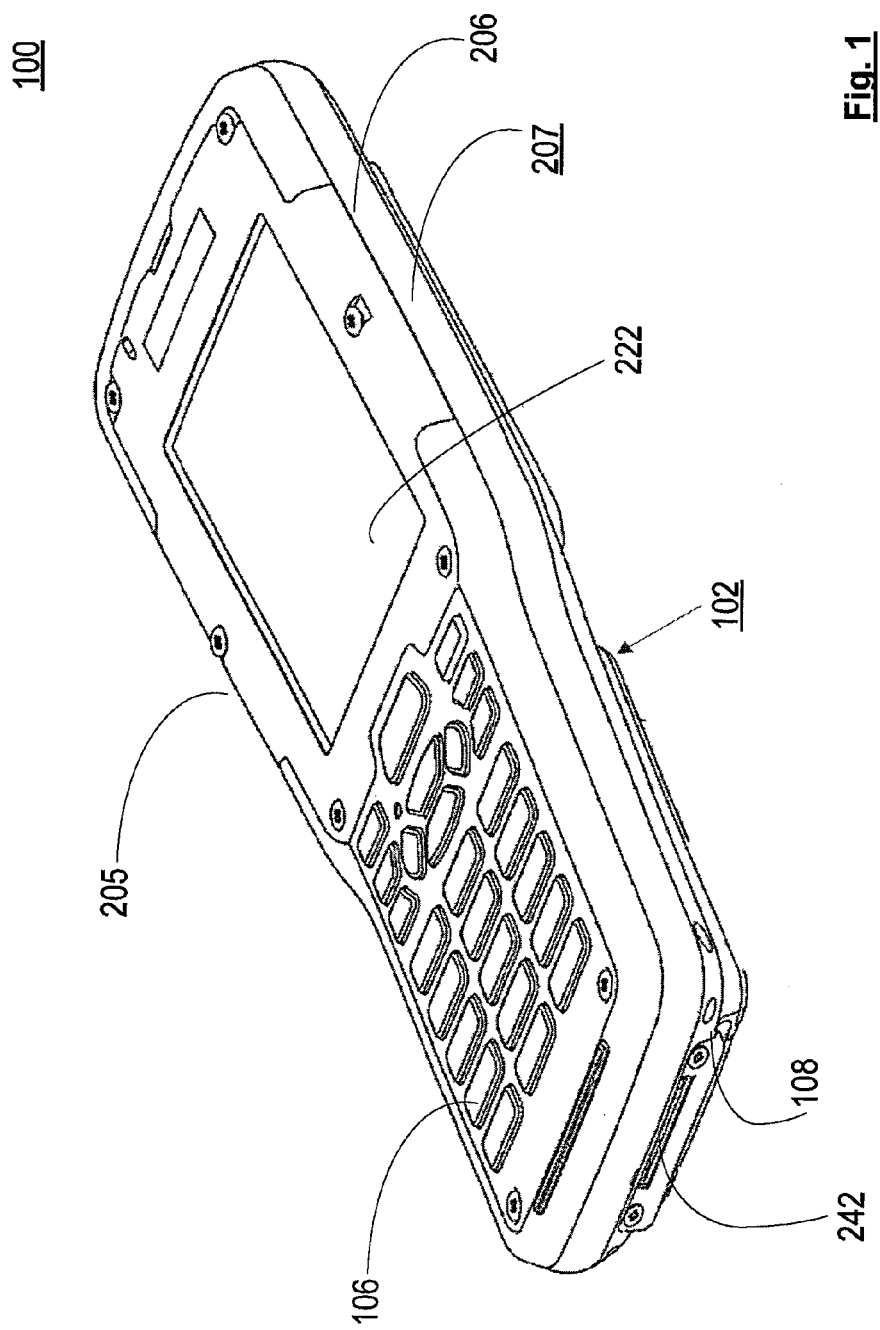
FIG. 1 is a diagram of a mobile computer in accordance with the present invention.

A mobile computing device in accordance with the present invention is indicated generally at 100 in FIG. 1. Mobile computing device 100 comprises a main body 102, a display 104, a keyboard module 106 and a battery compartment 108. Additionally, in the present embodiment, mobile computing device 100 has the capability of wirelessly communicating data and/or voice, to and from servers as well as data acquisition sources within a communication network. In one embodiment, the main body 102 comprises a top housing frame 205 and a bottom housing frame 206. In the embodiment shown, the top housing frame 205 may house the keyboard module 106 and the display screen 222. The bottom housing frame 206 may house the battery compartment 108 for housing a rechargeable battery (210 in FIG. 2). The bottom housing frame 205 further comprises a circuitry module 207 (i.e. a circuit board) for providing the electronic components required to implement at least a portion of the functionality provided by mobile computing device 100.

Continuing with the embodiment depicted in exemplary manner in FIG. 1, it is noted that by housing, it is meant that a module, including battery 210 and circuitry module 207, are substantially located or disposed within bottom housing frame 206. Circuitry module 207 may include any combination of electronic components of mobile computing device 100, such as any combination of wireless communication subsystem 211, microprocessor 238, random access memory 226 and flash memory 224. However, it will be appreciated by those of skill in the art that circuitry module 207 may not exclusively house all of the electronic components and interconnections necessary for mobile computing device 100 to function as intended.

Figure 3:
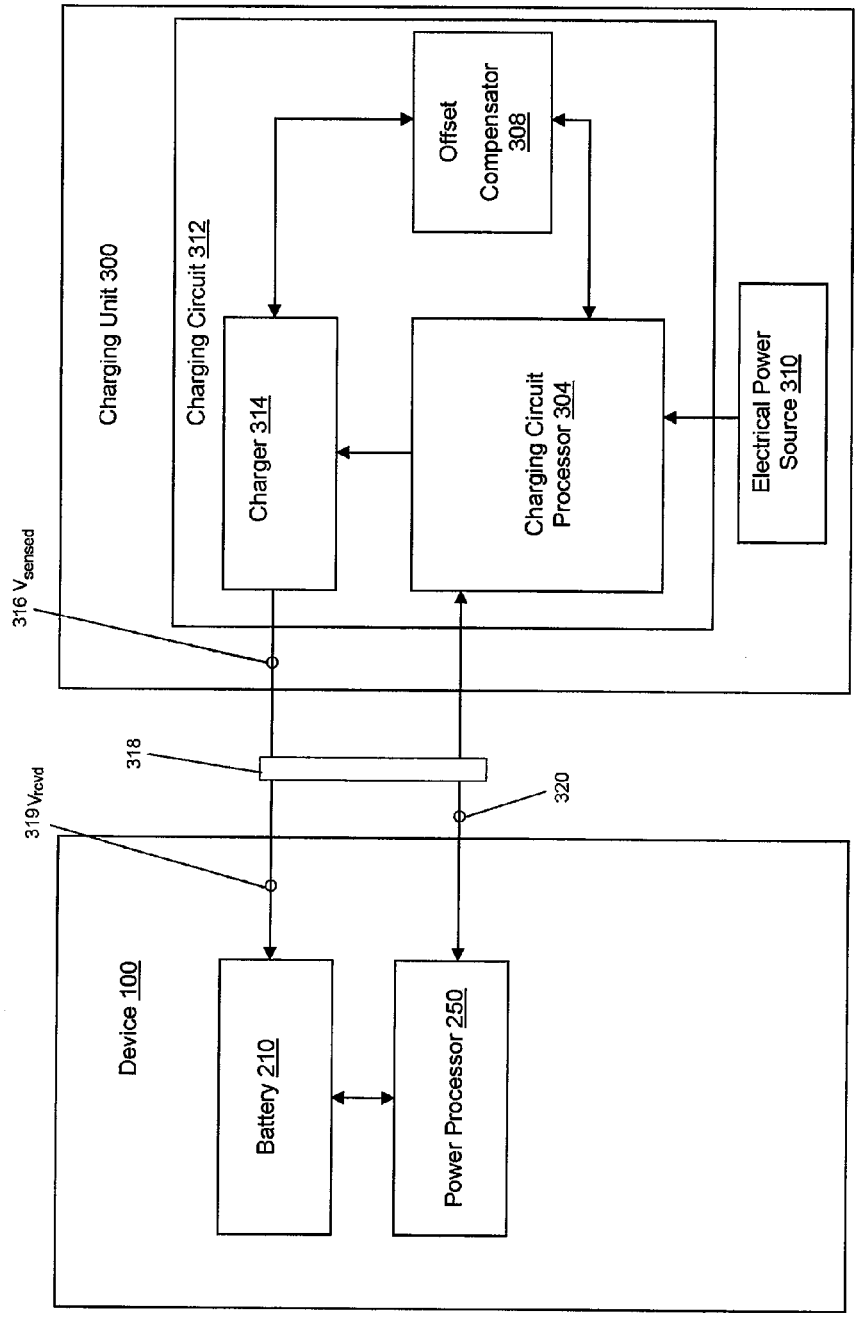
FIG. 3 is a block diagram illustrating the communication between the mobile computing device of FIG. 1 and an external charging unit in accordance with the present invention.

Specifically, according to a preferred embodiment, the circuitry module 207 is absent a computing device charging circuitry for charging the battery 210 of mobile computing device 100. Instead, the charging circuitry is provided on an external charging unit (an example of which is shown in FIG. 3). The external charging unit (i.e. charging unit 300) comprises an electrical power source 310 (or is configured to be coupled to an electrical power source 310) and the charging circuitry 312. As will be described below, the charging circuitry 312 monitors the voltage of the rechargeable battery 210 and the electrical power source 310 provides the electrical charge for charging the rechargeable battery 210 in response to the monitored voltage reading of the rechargeable battery 210. It will be appreciated that prior mobile computing device architectures included the battery charging circuitry located internally on the mobile computing device and the mobile computing device would then be tethered to a power supply to charge the battery. In such cases, the mobile computing device must be sized to include the charging circuitry and thus is larger and/or heavier than would otherwise be required. Further, when operating, the charging circuitry typically produces significant amounts of waste heat which the mobile computing device must be designed to accommodate and dissipate.

However, according to the preferred embodiment wherein the charging circuitry 312 is provided on an external device (i.e. charging unit 300 shown in FIG. 3), the waste heat from the charging circuitry 312 need not be dissipated by the mobile computing device 100. Further, as the amount of waste heat produced by charging circuitry 312 is proportional to the charging current, generally higher charging currents can be employed with the present invention than would be the case if charging circuitry 312 is located within mobile computing device 100.

As a result of charging circuitry 312 being located on charger 300, the circuitry module 207 has additional space freed up for other processing circuitry to be added for the device or for circuitry module 207 to be reduced in size/weight, or both. Further, since the charging circuitry 312 is located on the charging unit 300, the battery compartment 108 may accommodate different types of rechargeable batteries 210, as long as the charging unit 300 and the rechargeable battery 210 are compatible with each other.

That is, by providing a charging unit 300 with a charging circuit 312 that is compatible with a selected rechargeable battery 210, the selected rechargeable battery 210 may be used within mobile computing device 100. In one aspect, the battery compartment 108 may be sized and electrically configured to accommodate a number of different rechargeable batteries 210 compatible with the charging unit 300. The number of different rechargeable batteries 210 being at least two different types. For example, the battery compartment 108 may be adjustably sized to receive different capacity batteries 210, or batteries of different battery chemistries.

Bottom housing frame 206 may completely, or partially, house a connector slot 242 whereby an external charging unit (i.e. charging unit 300) may be electrically coupled (i.e. via a suitable connector) to the electrical contacts of the rechargeable battery 210 of battery compartment 108.

Figure 2:
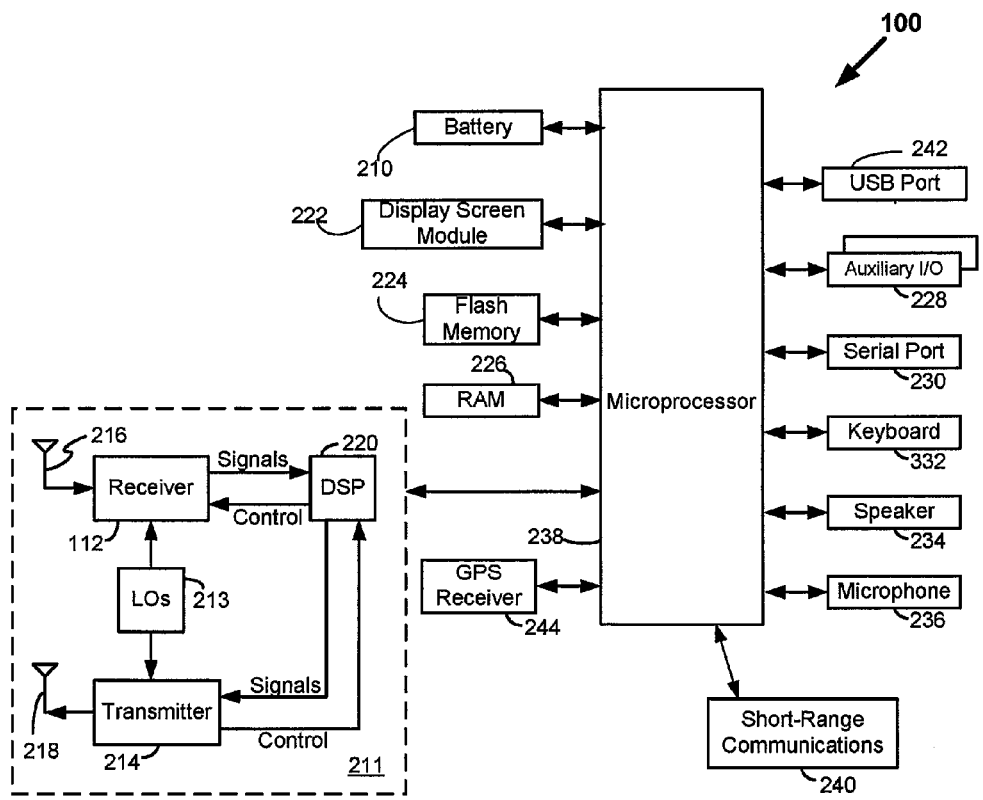
FIG. 2 is a block diagram of the subsystems of the mobile computing device of FIG. 1.

Referring to FIG. 2, a block diagram illustrating an example of the functionality provided by mobile computing device 100 is indicated generally at 200. The circuitry module 207 includes a microprocessor 238, which controls general operation of mobile computing device 100. The microprocessor 238 also interacts with functional device subsystems such as a communication subsystem 211, the display module 222, a flash memory 224, random access memory (RAM) 226, auxiliary input/output (I/O) subsystems 228, serial port 230, keyboard 232, speaker 234, microphone 236, short-range communications subsystem 240 such as a Bluetooth™ transceiver for example, and a Universal Serial Bus (USB) expansion port 242 for peripherals. Mobile computing device 100 includes a power source, such as a rechargeable battery 210 which may also be removable and replaceable from mobile computing device 100. Mobile computing device 100 may also include a positioning device 244, such as a GPS receiver for example, for receiving positioning information.

Operating system software used by the microprocessor 238 can be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on mobile computing device 100. A predetermined set of applications, which control basic device operations, may be installed on mobile computing device 100 during its manufacture. These basic operations typically include data and voice communication applications, for example. Additionally, applications may also be subsequently loaded onto mobile computing device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of mobile computing device 100 and may provide enhanced on-device features, communication-related features, or both.

The radio frequency (RF) communication subsystem 211, includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the communication network in which mobile computing device 100 is intended to operate, but may include communication functionalities such as radio-frequency identification (RFID), Wi-Fi WLAN based on 802.11 standards, and the like.

The display module 222 is used to visually present an application's graphical user interface (GUI) to the user via a display screen. The display screen module 222 may employ a touch screen display, in which case the user can manipulate application data by modifying information on the GUI using direct touches by a finger. Depending on the type of mobile computing device 100, the user may have access to various types of input devices, such as, for example, a scroll wheel, trackball, light pen and/or a touch sensitive screen.

In the present embodiment, the circuitry module 207 may be mounted onto a metal frame in order to be attached to the main body 102 of mobile computing device 100.

For many rechargeable batteries, a recommended charging profile is used for safely and effectively charging the battery. Typically, the charging profile specifies charging by delivering a specified constant current to the battery until a threshold voltage is reached at the battery and this is referred to as constant current charging. In other words, the specified charge current is applied to the battery and, as it charges, the voltage of the battery increases and is monitored. Once the desired threshold voltage is reached, the charging profile specifies that the charging circuit complete the charge of the battery by providing a constant voltage and allowing the charge current to drop as the battery is charged. The constant voltage is provided to the battery until a current decrease of a selected amount is detected, indicating that the battery is properly charged. The specific threshold voltage, constant current rates and other related charging parameters can vary depending upon the capacity of the battery, the battery chemistry and other factors as will be apparent to those of skill in the art.

As illustrated in FIG. 3, external charging unit (element 300) provides electrical connection between the charging circuit (element 312) and mobile computing device 100, via mechanical connectors 318 (i.e. pogo pins, flex connectors, etc.). As will be apparent to those of skill in the art, electrical connections made with such mechanical connectors 318 inherently include an impedance and across which a voltage drop occurs. These impedance losses result in the voltage measured at the output of charging unit 300 (i.e. $V_{sensed}$ 316) being higher than the voltage received (i.e. $V_{rcvd}$ 319) at the battery 210 as the impedances of the connectors 318 along the charge path between the charger 314 and the battery 210 cause a voltage drop to occur a $V_{rcvd}$ 319.

In addition, other impedances may be seen as a result of other connectors (i.e. one or more connectors between mobile computing device 100 and the charging unit 300) and other components in the charge path between the charging circuit 312 and mobile computing device 100. Due to these voltage drops, the voltage $V_{rcvd}$ 319 at mobile computing device 100 (i.e. the battery 210) is less than the desired charging profile voltage (also referred to as a threshold voltage) for charging the battery 210 as sensed at $V_{sensed}$ 316.

Accordingly, in order for the desired threshold voltage to be provided to the battery 210 such that the battery voltage 210 is charged according to the charging profile at the desired rate and threshold voltage, a compensation mechanism is provided by the charging unit 300.

Accordingly, a power processor 250 measures the voltage $V_{rcvd}$ 319 at the battery 210 as shown in FIG. 3 and, that measured parameter value is provided to the charging circuit 312 of the charging unit 300, over a digital communication path 320, to allow for the sensed voltage $V_{sensed}$ 316 to be corrected such that the $V_{rcvd}$ 319 is at the desired threshold value despite any voltage drops through the charge path.

Power processor 250 can be any of a wide variety of battery management devices (often referred to as "battery gas gauges") which are employed with batteries such as Li-ion batteries whose charging and operating parameters are controlled for safety and longevity issues. Such gas gauge devices typically output signals which are available to power management functions of the mobile computing device powered by the battery, the signals representing battery parameters to enable the mobile computing device to estimate expected remaining operating time, battery condition, etc. The capabilities and operation of such gas gauge devices is well known to those of skill in the art and will not be further discussed herein. The measured value communicated over path 320, representing the voltage at the battery, is a value which is available from such power processors 250.

Referring now in detail to FIG. 3, charging unit 300 comprises a charging circuit 312, and an electrical power source 310. The charging circuit 312 comprises a charging circuit processor 304, an offset compensator 308, and a charger 314. The charging unit 300 is electrically coupled to mobile computing device 100 and the battery 210 via mechanical connectors 318. The electrical connection through mechanical connectors 318 may be via the connector port 242 which can be adapted to receive and/or secure connector 318 with connector port 242 for coupling the external charging unit 300 to the electrical contacts of the rechargeable battery 210.

The charger 314 is thus configured for providing a constant charge current in a first mode of operation (i.e. to mobile computing device 100). In this first mode of operation, the charger 314 is configured for providing the constant charge current and allowing $V_{rcvd}$ (and $V_{sensed}$) to increase as the battery is charged. Charger 314 operates in this first mode of operation until the $V_{sensed}$ reaches the predetermined threshold voltage that is desired for charging the battery 210.

However, if no compensation is applied, $V_{sensed}$ is higher than $V_{rcvd}$, due to the impedances in the charge path, and thus charger 300 will incorrectly determine that a switch to the second charging mode (constant charge voltage) should be performed.

Specifically, once the charger 314 determines that $V_{sensed}$ is approximately equivalent to, or greater than, the desired threshold voltage, the charger 314 is configured to operate in a second mode of operation and provide a constant charge voltage until the charge current decreases, indicating that battery 210 is appropriately charged. As will be understood, a safety mechanism may be incorporated in the charger 314 such as to allow the threshold voltage to be limited to a maximum threshold voltage to prevent overheating or other issues with the charger 300.

Instead, as will be further described with respect to FIG. 3, the charging processor 304 and the offset compensator 308 are configured for cooperatively causing the charger 314 to remain in the first mode of operation for a longer period of time (i.e. even after $V_{sensed}$ 316 reaches the threshold voltage) such as to allow the $V_{rcvd}$ at battery 210 reach the desired threshold voltage value, thereby compensating for any impedance losses across the charge path.

Continuing with the embodiment depicted in FIG. 3, the power processor 250 on mobile computing device 100 is configured to measure battery 210 parameters comprising at least one of the voltage value and the current value of the battery 210 and provide at least one of the detected battery voltage value and the current value to the charging circuit processor 304. Power processor 250 may further be configured to measure other battery 210 parameters comprising any one of the battery voltage, battery charge current, capacitance, temperature and other charge parameters for monitoring the charging activity of the battery 210.

The power processor 250 is further configured to provide the battery parameters to the charging circuit processor 304 across a digital communication path 320. In one aspect, the charging circuit processor 304 may be configured to poll the power processor 250 for receiving the battery parameters thereafter. In another aspect, the power processor 250 may be configured to provide the battery 210 parameters at certain intervals and/or upon detection of pre-determined criteria that may trigger the battery 210 parameters to be provided to the charging processor 304.

The charging circuit processor 304 is configured to monitor the current drop of the battery 210 as determined and reported by the power processor 250. If a current drop of greater than a predefined minimum drop value is detected, this indicates that the charger 314 has completed the first mode of operation (i.e.—constant current charging) and should switch to the second mode (constant voltage) of operation. However, if the current drop is realized before $V_{rcvd}$ attains the desired threshold voltage value (i.e. the measured battery voltage value as provided by the power processor 250 is less than the desired threshold voltage value), then the charging circuit processor 304 is configured to provide a control signal or a trigger to the offset compensator 308 to compensate for the impedance losses through the charge path. Specifically, the offset compensator 308 applies a negative offset to the voltage value charger 314 senses at $V_{sensed}$ 316 and thus charger 314 allows the voltage sensed by the charger 314 at $V_{sensed}$ 316 to continue to rise so that $V_{rcvd}$ 319 at battery 210 can reach the threshold voltage despite impedance losses in the charge path. Thus, charger 314 will remain in, or revert to, the first mode of operation until $V_{rcvd}$ reaches the threshold value.

In this manner the charging processor 304 continually monitors the battery voltage and battery current to determine when the battery 210 has reached the desired threshold value.

Accordingly, the charger 314 is configured to continue providing a constant current (first mode of operation) to the battery 210 until the battery 210 reaches the predefined threshold voltage value (as detected by the power processor 250 and communicated to the charging processor 304). The charging unit 300 is configured to compensate for the difference between the measured voltage at $V_{sensed}$ 316 detected by the charging circuitry 312 and the voltage ($V_{rcvd}$) of battery 210. Once the threshold voltage is reached at the battery 210 (as determined by the power processor 250), the charging circuit processor 304 is configured (second mode of operation) to deliver a constant voltage to the battery 210 until the battery 210 charge current decreases. In this way, the desired threshold voltage is provided and reached at the battery 210.

Figure 4:
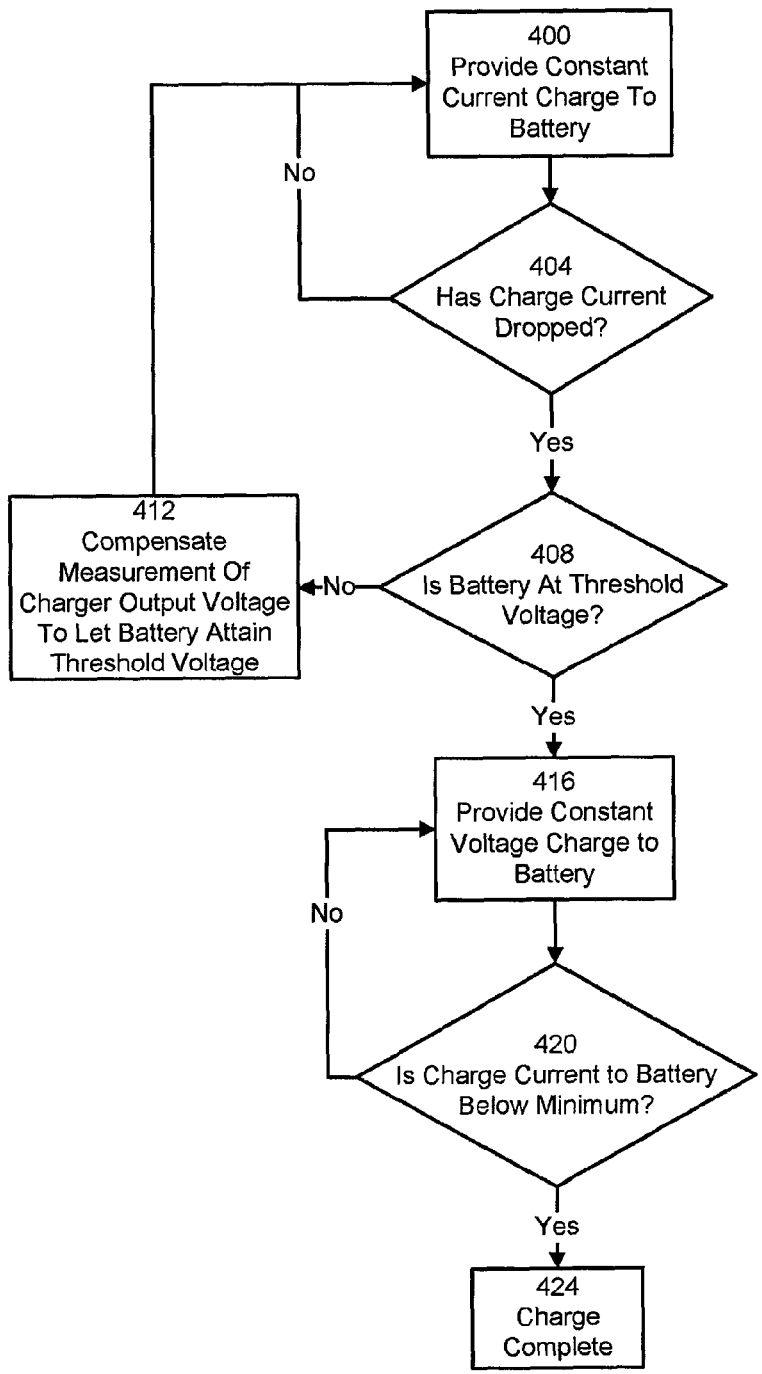
FIG. 4 is a flow chart of operations between the charging unit and the mobile computing device for charging the battery of the mobile computing device.

Referring again to FIG. 3, placing the charging circuit 312 external to mobile computing device 100 allows flexibility with mobile computing device 100 such as to allow a variety of batteries 210 (i.e. of different types and/or charging capacities) to be used in mobile computing device 100 as long as they are compatible with the charging circuit 312. For example, it is contemplated that different batteries (or different capacities of batteries and/or batteries from different manufacturers and/or batteries with different battery chemistries) can be employed in portable computer device 100 and charged with charger 300, provided that their respective power processor 250 provides the relevant battery charging parameters (threshold voltage, amount of current drop, etc.) to charger 300. Accordingly, this enhances the practicality and economics of replacing the battery 210. Referring now to FIG. 4 a flow chart of a method of operation 400 for a charger in accordance with the present invention is shown. At step 400, the charger 314 commences, in the first mode of operation, to provide a constant charge current to battery 210 based on the charge profile for battery 210, as can be obtained from power processor 250 or via any other suitable means.

At step 404, charger 300 determines if the charge current to battery 210 has dropped. If the current has not decreased, the method returns to step 400. If at step 404 the charge current has dropped, this has occurred because charger 300 has determined that $V_{sensed}$ 316 has reached the threshold value for battery 210, and charger 300 operates to prevent further increases to the voltage at 316, thus resulting in a decrease in the charge current applied to battery 210.

Accordingly, if a drop in the charge current has been detected at step 404, at step 408 charger 300 determines if battery 210 has actually reached the threshold voltage. As described above, this can be achieved be examining the information provided from power processor 250 over digital connection 320, including the provided measure of $V_{rcvd}$ provided by power processor 250.

If, at step 408, it is determined that battery 210 is not at the threshold voltage, offset compensator 308 will compensate (decrease) the sensed value of the voltage $V_{sensed}$ 316 to compensate for the difference between the sensed value of $V_{sensed}$ 316 and the reported value of $V_{rcvd}$ 319 and the method returns to step 400.

As the voltage drop due to the impedances of the connectors in the charge path is dependent upon the charge current, the method will continue to perform steps 400, 404, 408 and 412 until, at step 408, it is determined that the battery voltage $V_{rcvd}$ is equal to, or above, the threshold voltage. When this determination is made, the method continues at step 416 wherein charger 300 commences charging in the second mode (constant voltage) of operation.

At step 420, the method checks the charge current to determine if it has fallen below a predefined minimum (provided as part of the charge profile). If the charge current is above the predefined minimum, the method returns to step 416 and the battery continues to be charged in the second mode.

If, at step 420, it is determined that the charge current supplied to the battery is at, or is below, the predefined minimum current level, the battery is assumed to be properly charged and the method completes at step 424.

As described above, the charger 314 is configured to operate in two modes of operation. That is, in a first mode the charger 314 provides a constant pre-defined charge current to the external battery 210 based on an output voltage 316 of the charger 314; and in a second mode provide a constant pre-defined charge voltage to the external battery 210. In one embodiment, the charger 314 is configured to switch from the first mode to the second mode when the output voltage of the charger 314 reaches a predefined threshold voltage. Preferably, the offset compensator 308 is configured for applying an offset voltage to the charger 314 to maintain the charger in the first mode to compensate for voltage drops resulting from impedances between the charger 314 and the external battery 210 thereby allowing the external battery voltage 210 to reach the threshold voltage. As described above, the offset voltage applied by the charger 314 may be in dependence upon the charging circuit processor 304, and the power processor 250 determining that the battery 210 has not reached the desired threshold voltage but the current of the battery 210 is dropping (indicative of the charger 314 operating in the second mode). Accordingly, the charging circuit processor 304 communicates with the offset compensator 308 to cause the applying of an offset voltage to the output voltage 316 of the charger 314. In another embodiment, once the charging circuit processor 304 determines that the charger 314 is operating in the second mode of operation but that the battery 210 has not reached the threshold voltage (based on the battery parameters), the offset compensator 308 applies an offset to the threshold voltage of the charger 314 (i.e. to increase the threshold voltage of the charger by a pre-defined amount such as to compensate for the impedance loss across the communication path between the charger 314 and the battery 210). In this way, the charger 314 does not switch to the second mode of operation until the increased threshold voltage is reached such as to allow the external battery 210 to reach the desired threshold voltage at the battery.

Although the specific implementations of the invention are described above, a person of ordinary skill in the art will appreciate that various modifications can be made without detracting from the spirit of the invention.

Although a mobile or handheld computer has been used to establish a context for disclosure herein, it is contemplated as having much wider applicability within the field of handheld devices. Furthermore, the disclosure herein has been described with reference to specific exemplary embodiments; however, varying modifications thereof will be apparent to those skilled in the art without departing from the scope of the invention as defined by the appended claims.

Therefore, although the invention has been described with reference to certain specific embodiments, various modifications thereof will be apparent to those skilled in the art without departing from the scope of the invention as defined by the appended claims.

What is claimed is:

1. A charging unit for charging a rechargeable battery on a mobile computing device, the charging unit to be electrically coupled to the mobile computing device, the charging unit comprising:
   a charging circuit comprising a charger configured to output a voltage and electrical current to the rechargeable battery of the mobile computing device external to the charging unit, the charging circuit configured to receive a measurement of the voltage received at the rechargeable battery as reported by the mobile computing device, the charger configured to charge the rechargeable battery in a first mode wherein a constant charge current is applied to the rechargeable battery until a predefined threshold voltage is obtained at the rechargeable battery and to then operate in a second mode wherein a constant charge voltage is applied to the rechargeable battery until the rechargeable battery is charged; and
   an offset compensator configured to apply an offset voltage to a measurement of the output voltage of the charger to compensate for voltage drops in the charge path between the charger and the rechargeable battery determined from the measurement of the voltage received by the rechargeable battery as reported by the mobile computing device thereby allowing the voltage of the rechargeable battery to reach the threshold voltage before entering the second mode.

2. The charging unit of claim 1, wherein the offset voltage is related to a difference between the measured voltage received by the rechargeable battery and the predefined threshold voltage.

3. The charging unit of claim 1, wherein the charger is configured to poll a power processor associated with the rechargeable battery across a digital communication path for receiving battery parameters in response to the polling.

4. The charging unit of claim 3 wherein the battery parameters include at least the predefined threshold voltage and the defined charge current.

5. A method for charging a rechargeable battery in a mobile computing device from an external charging unit, the charging unit configured to be temporarily electrically coupled to the mobile computing device, the method comprising:
   operating in a first mode wherein a constant predefined charge current is supplied to the rechargeable battery until the voltage received at the rechargeable battery as reported by the mobile computing device temporarily electrically coupled to the charging unit is at least equal to a predefined threshold voltage for the rechargeable battery;
   during operation in the first mode, measuring the output voltage of the charging unit to determine if the output voltage of the charger is at least equal to the predefined threshold voltage for the rechargeable battery and, if the output voltage is at least equal to a predefined threshold voltage for the rechargeable battery, determining if the charge current has decreased;
   if the charge current has decreased, obtaining from a power processor of the mobile computing device a measurement of the voltage received at the rechargeable battery and, if the voltage received at the rechargeable battery is less than the predefined threshold voltage, then applying an offset voltage to the measurement of the charger output voltage to compensate for voltage drops between the output of the charger and the voltage received by the rechargeable battery;
   if the charge current has decreased and the voltage received at the rechargeable battery is at least equal to the predefined threshold voltage, operating the charger in a second mode wherein a constant charge voltage is applied to the rechargeable battery; and
   when in the second mode the charge current falls below a predefined minimum, deciding the rechargeable battery is charged.

6. The method of claim 5 wherein battery parameters are obtained by the charger from a power processor associated with the rechargeable battery.

7. The method of claim 6 wherein the battery parameters include at least the predefined threshold voltage and the predefined charge current.

8. The method of claim 5 wherein the offset voltage is related to a difference between the voltage received by the rechargeable battery as reported by the mobile computing device and the predefined threshold voltage.

9. The method of claim 5, further comprising polling the power processor across a digital communication path between the charger and the mobile computing device for receiving the battery parameters in response to the polling.

* * * * *